Figure 1:
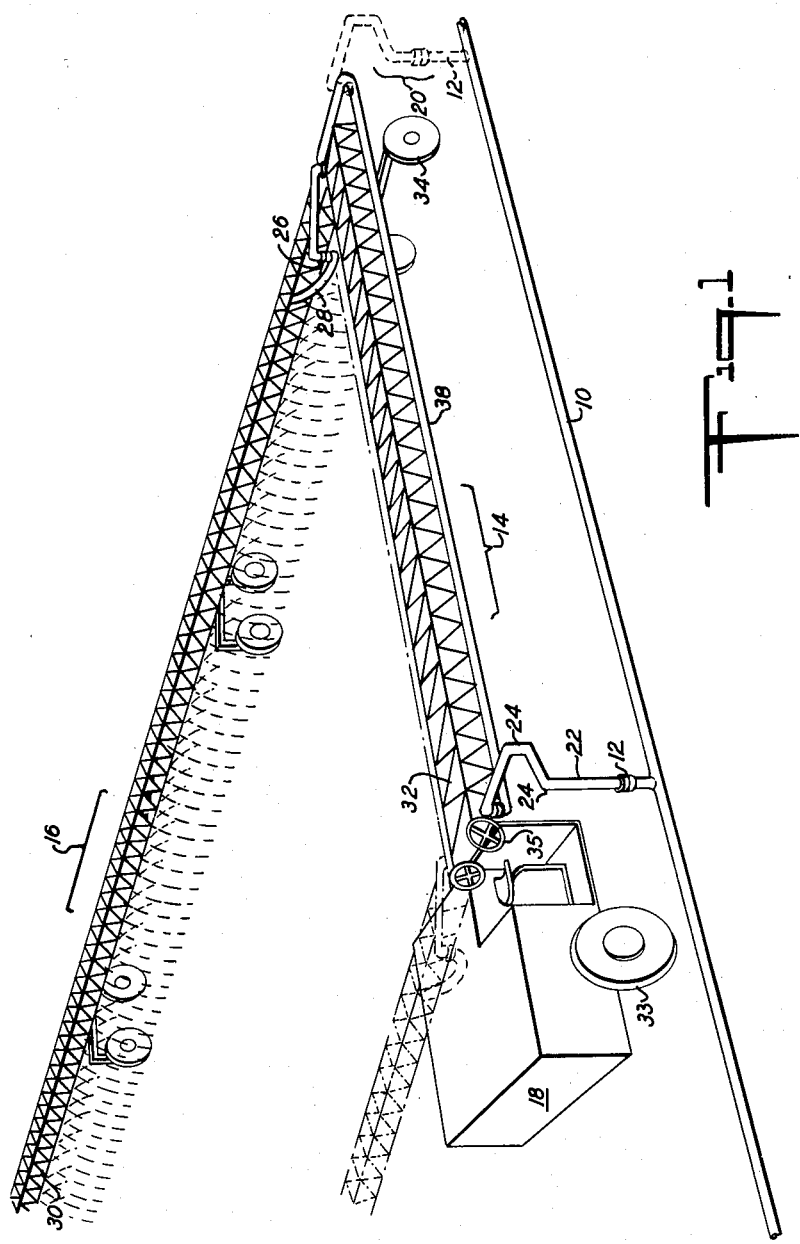

June 12, 1956  W. A. ENGEL  2,750,228
IRRIGATING MACHINE
Filed Sept. 30, 1954  7 Sheets-Sheet 1

INVENTOR
WENDLIN A. ENGEL
BY Parker and Walsh
ATTORNEYS

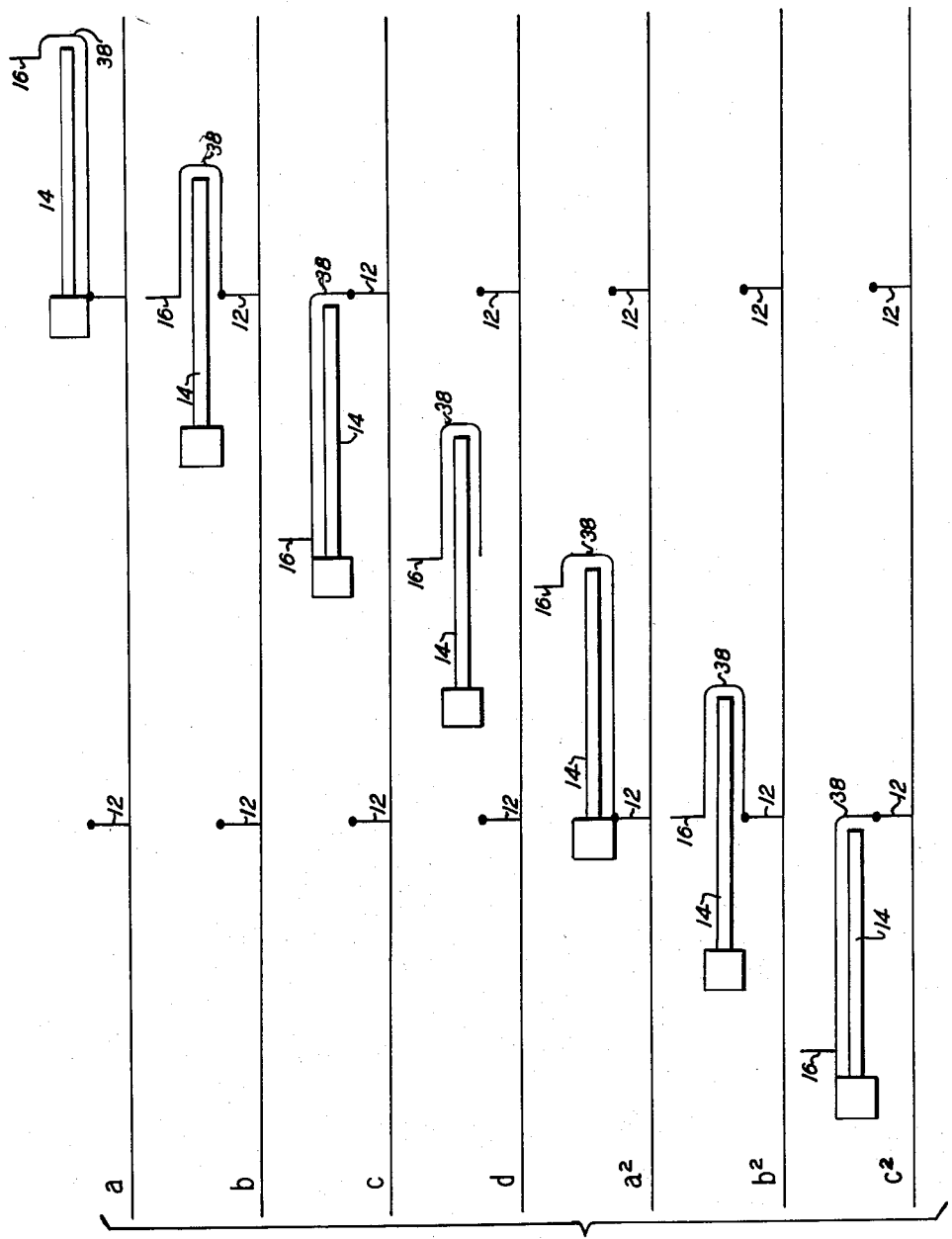

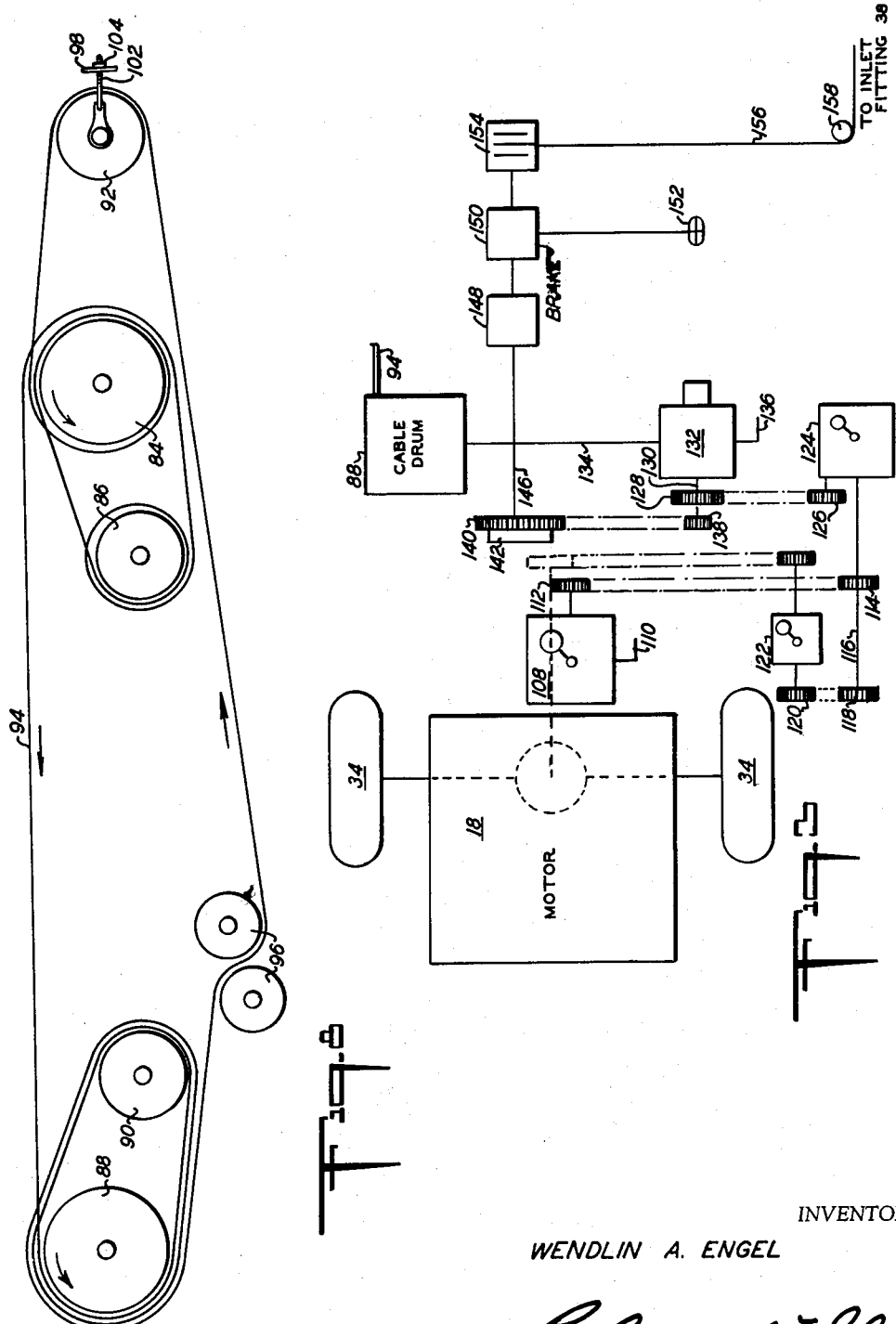

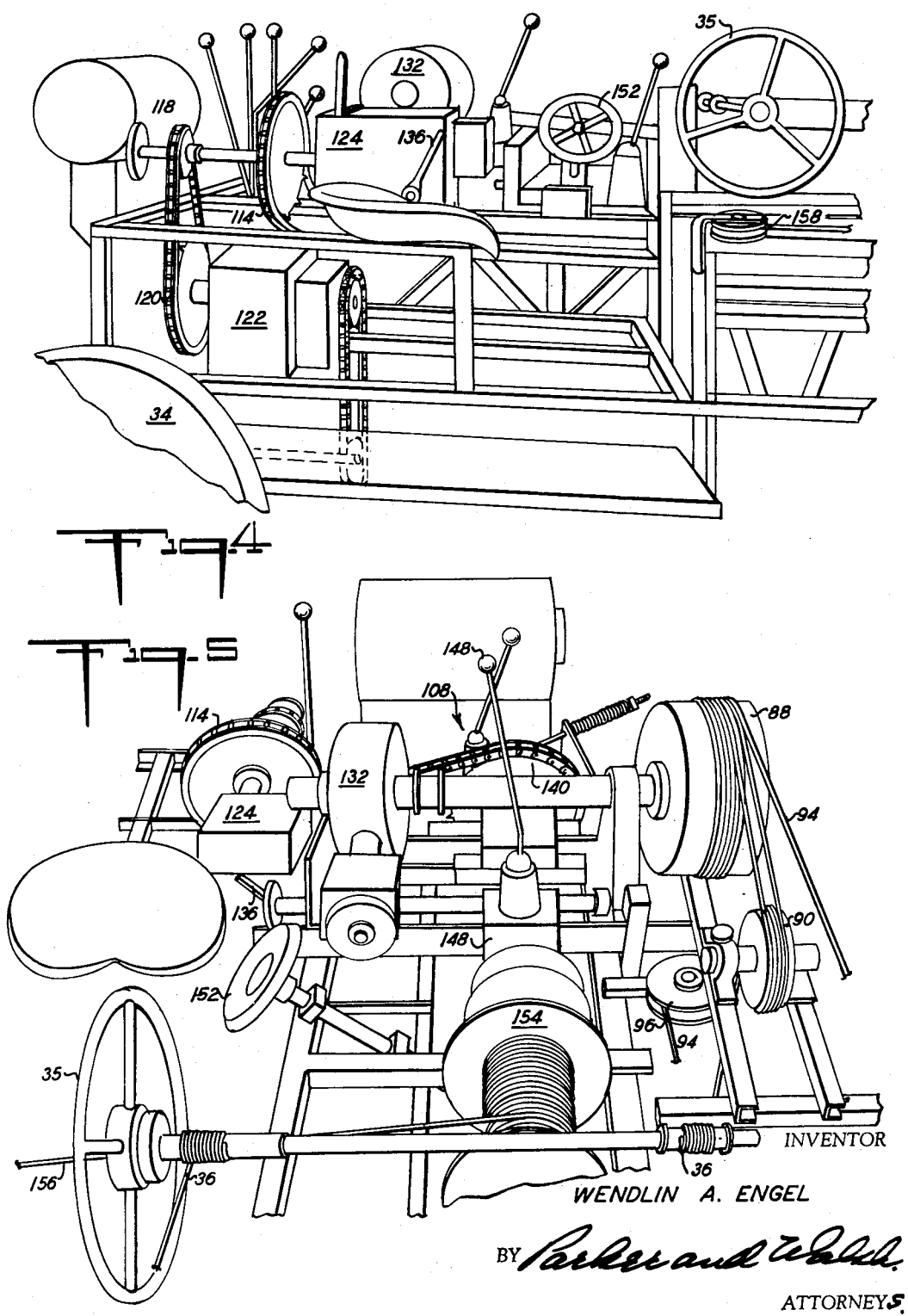

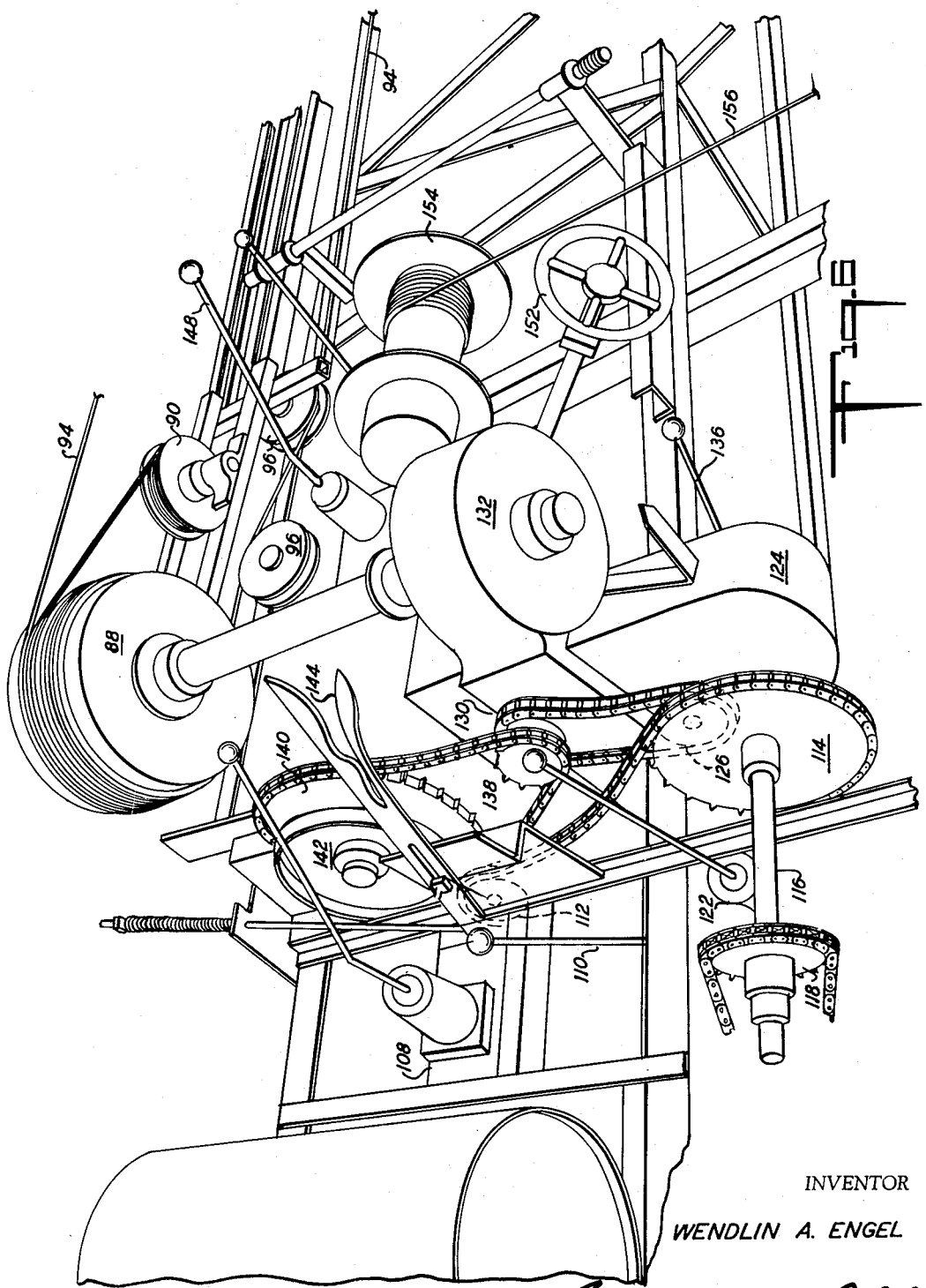

June 12, 1956   W. A. ENGEL   2,750,228
IRRIGATING MACHINE
Filed Sept. 30, 1954   7 Sheets-Sheet 6
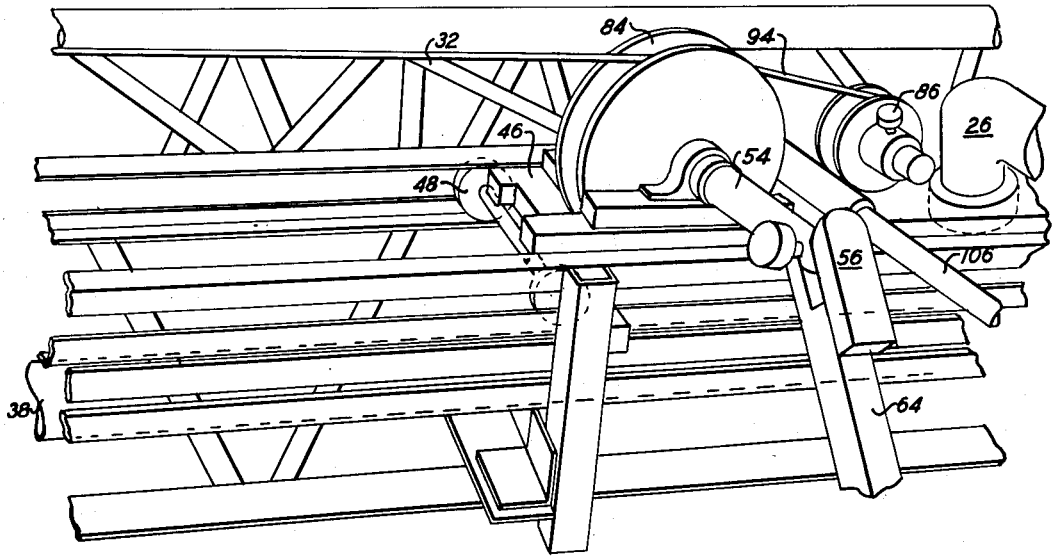
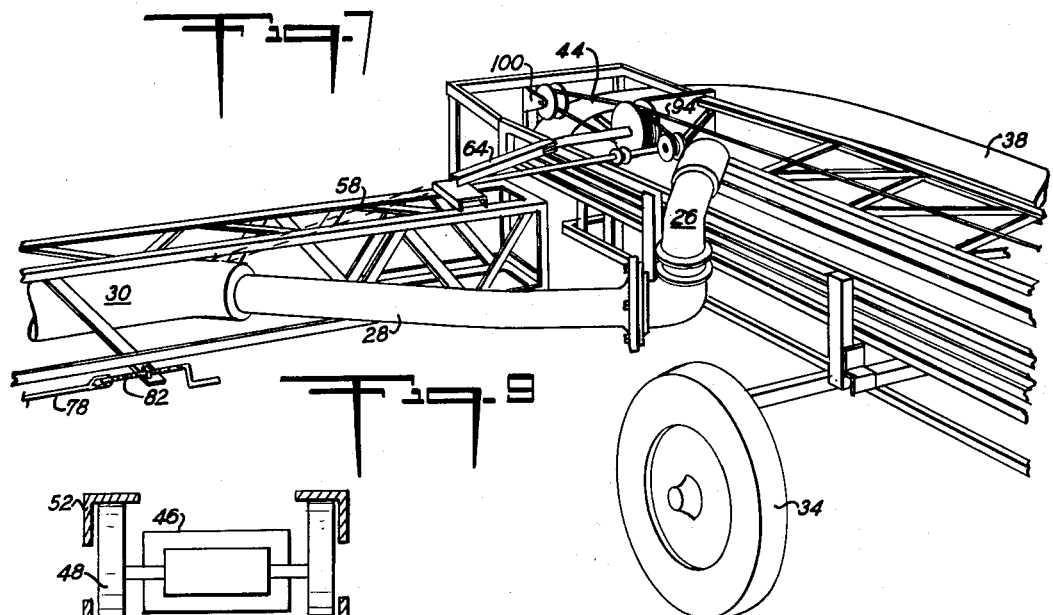
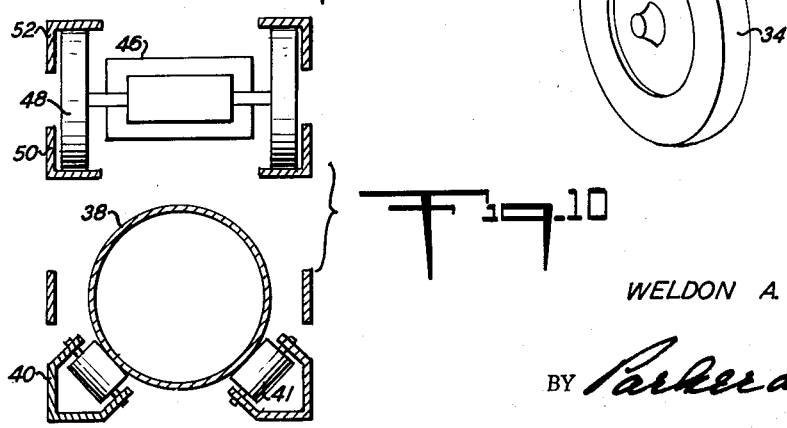
INVENTOR
WELDON A. ENGEL
BY *Parker and Walsh*
ATTORNEYS.

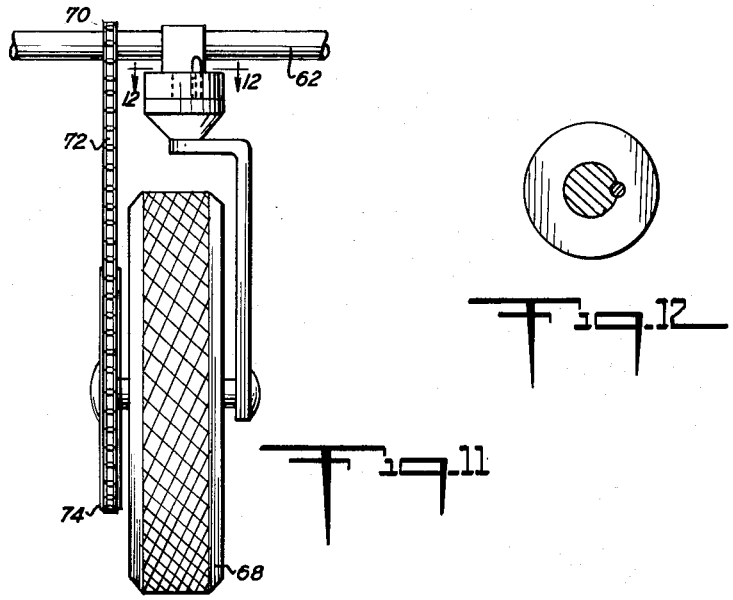
Fig. 11
Fig. 12
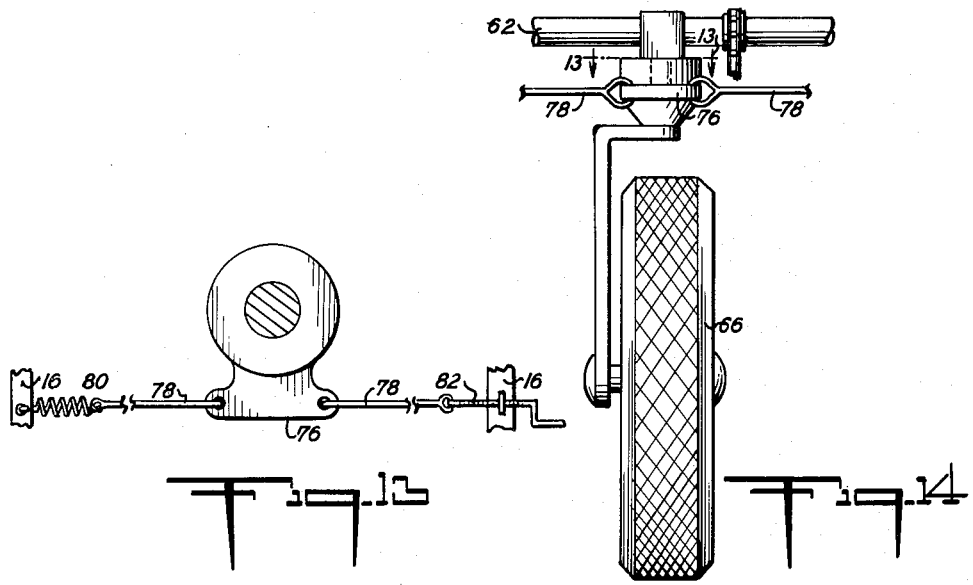
Fig. 13
Fig. 14
INVENTOR
WENDLIN A. ENGEL

# United States Patent Office 2,750,228
Patented June 12, 1956

2,750,228
IRRIGATING MACHINE
Wendlin A. Engel, Ellis, Kans.

Application September 30, 1954, Serial No. 459,252

7 Claims. (Cl. 299—47)

This invention relates to a self-propelled irrigating machine.

Irrigation that depends solely upon gravity flow of water through open channels or pipes and delivery of the water to the ground to be irrigated at spaced points in comparatively large streams is wasteful of water and frequently fails to accomplish satisfactory delivery of the water to the plants needing it.

There also exist piping systems for delivery of the water to the growing crops. One system of this type employs pipe of comparatively small diameter and is intended to be substantially permanent in nature since the pipe is so small that it requires operation for an extended period of time to deliver sufficient water to the point needed. The other type employs pipe of much larger diameter arranged in detachable sections and having sprinkling devices arranged at spaced portions along the pipe. It is contemplated that these pipe sections may be carried from field to field as required, the pipe sections being arranged for easy connection at suitable spaced points. Each of these arrangements involves a substantial investment on the part of the farmer and in the case of the portable type a great deal of labor is required to effect the transfer of the pipe from one field to another.

Another arrangement also exists for sprinkling large areas of ground by means of a self-propelled machine for applying the water to the ground. Heretofore one of the principal difficulties in the operation of this type of machine has been that of maintaining a connection with the source of water while the machine is traveling over the ground. The present invention aims to deal particularly with this problem while at the same time providing a unitary machine for conveniently and effectively irrigating a large area with a controlled amount of water applied evenly over the entire area. The device also has the advantage that it may be easily moved from field to field and requires the minimum of auxiliary apparatus.

The device of this invention can be best understood by reference to the accompanying drawings forming a part of this specification, together with the description that follows.

In the drawings:

Figure 1 is a perspective view of the entire device, showing it at the beginning of a cycle of operation, in full lines, with a part thereof, at the end of the cycle, shown in dotted line, Figure 2 is a schematic presentation of a complete cycle of the operation of the device, Figure 3 is a schematic top plan view of the controls of the device viewed from the supply side, Figure 4 is an elevation of the same controls viewed from the supply side, Figure 5 is a perspective view of the same facing the front of the machine, Figure 6 is another perspective looking toward the rear of the machine from the supply side, Figure 7 is an elevation of the carrier block and associated mechanism viewed from the boom side, Figure 8 is a schematic diagram of the endless cable reeving, Figure 9 is a view of the connection between the boom and carrier taken from above, Figure 10 is a view partly in cross-section of the carrier block and the flexible tube, Figure 11 is a rear view of the rear boom wheel, Figure 12 is a top view of the same, Figure 13 is a front view of the front boom wheel, and Figure 14 is a top view of the same.

This device contemplates the use of a relatively fixed supply line 10 through which water is supplied from any desired source. This supply line is provided with spaced connections 12 to which the irrigating machine may be successively connected as the machine travels the length of the supply line. The line and its connections do not form a part of the present invention but the successful operation of the invention requires the availability of such a line. In practice, I have found that with the present embodiment of my invention, the connections 12 may be spaced along the pipe 10 at approximately 80 foot intervals.

The irrigation machine itself is principally made up of a traveling carrier 14 with a sprinkling boom 16 extending out from one side of it. The carrier is provided at its forward end with a power plant 18.

The traveling carrier is connected to the supply line by a flexible connection 20 including upright 22 and swing joints 24. The boom which moves the length of the carrier in a manner to be subsequently disclosed carries a delivery pipe 30 through which the water is delivered the length of the boom which may extend out from the carrier as much as 200 feet if so required. The delivery pipe may be suitably perforated at intervals to allow the discharge of water or it may carry distributing sprinklers according to the type of irrigation desired. The delivery pipe is connected to the carrier by means of swing joint 26 and flexible metallic hose 28.

At this point it is convenient to state the manner of operation of the machine. The machine when first connected has at its forward, power-driven end the supply pipe with the boom being located at the rear end of the carrier. The machine is then driven forward along the length of the supply line with the connection to the supply line moving backwards relative to the machine at a stated rate of speed. Meanwhile the boom moves forward along the carrier at about twice the rate of advance of the machine until the connection to the supply line has moved all the way to the rear of the carrier and the boom has advanced all the way to the front. The machine is then disconnected from the supply pipe and driven forward in high gear another length, the boom meanwhile remaining stationary while the connection on the machine travels in a manner to be hereinafter disclosed from the rear of the machine to the front during the time the machine advances. Thus it will be seen that the machine has two alternate phases of operation: a sprinkling phase during which the machine travels 40 feet while 80 feet of ground is sprinkled and a recuperative phase during which time no sprinkling takes place but the machine travels another 40 feet. In consequence, connection along the supply pipe may be spaced at 80 foot intervals. The manner in which these operations are accomplished will now be described:

The carrier element of the machine is made up of a central frame 32 constructed as a box girder with power driven front wheels 33 below the power plant and steerable rear wheels 34. The steering wheel 35 is mounted near the front end of the carrier frame 14 and is connected by cable 36 passing over suitable pulleys (not shown) to the underside of the machine to the suspension (not shown) of the rear wheels 34.

About both sides of the central frame a flexible hose 38 is supported upon an open trackway 40 and rollers 41 and at the rear end of the machine other rollers and a freely rotatable guide wheel 44. The swing joint 26 connects the delivery pipe 30 with the hose 38, the connection between elements 38 and 26 being made in the carrier block 46 which serves to move the hose along its trackway, the carrier block riding on wheels 48 which travel along the delivery side of the machine on track 50 made up of angle bars 52.

By means of stub drive shaft 54 mounted on the carrier block, universal joint 56, a propeller shaft and another universal joint, the boom drive shaft 62 receives power from the power plant 18. The manner in which the carrier block 46 is driven from the power plant will be indicated later. Since, as will be shown, there is considerable lost motion, lengthwise of the carrier 14, between the carrier block 46 and the boom 16 and since it may be desirable to disconnect the boom from the carrier portion 14 of the machine for transportation, a slip connection is made between the square inner end of the propeller shaft (not shown) and the square tubular member 64 attached to universal joint 56.

As shown, the boom is formed as an open box type girder. If desired, it may be built in sections suitably joined together. At intervals it is supported and propelled by pairs of front wheels 66 and rear wheels 68, each mounted in castering arrangement. The rear wheels are driven through spur gears 70 mounted on drive shaft 62, chains 72 and pinions 74 mounted on the spokes of the wheels 68. In normal drive position, the caster mounting of wheels 68 is pinned so that the track of the wheel is at right angles to the boom. If it is desired to transport the boom from one field to another the pin may be removed so that the wheel is free to caster lengthwise of the boom as the boom is pulled by separate power.

The boom is steered through the front wheels 66. A plate 76 mounted on the upper suspension of wheel 66 is connected by wire 78 to spring 80 mounted on the outer portion of boom 16 and to take-up screw 82 on the inner end of the boom. The boom travels at a comparatively low rate of speed which is generally less than the order of one mile per hour. Assuming that the front wheels are set for the boom to travel straight forward, it is possible for a man traveling on foot to adjust the take-up screw, pulling against spring 80 so that the boom may be caused to travel slightly to one side or the other. When the boom is transported from one field to another, the steering wire may be disconnected to permit the front wheel as well as the rear wheel to caster freely.

The drive for stub shaft 54 is provided by a cable 94 passing over carrier drum 84 and carrier take-up drum 86 to power drum 88 and power take-up drum 90, thence over guide pulleys 96 to tension pulley 92 and back to carrier drum 84, as shown schematically in Figure 8. The tension pulley 92 is supported on a rear extension 98 of the central frame 32 and is provided with clevis 100 which in turn is secured to a threaded rod 102 and tightening nut 104. By this device the tension in the endless cable may be suitably adjusted and when so adjusted the system needs no further attention except to take up normal wear. It is highly important that the boom 16, which is only flexibly connected to the traveling carrier 14 through flexible hose 28 and tubular drive shaft 64, shall move forward at the desired rate of speed along the side of the carrier frame 14 but at the same time it must have sufficient flexibility of operation to travel over irregularities in the ground without severe stress being placed upon the flexible connections.

The boom is designed to travel slightly ahead of the carrier block 46 from which it derives its power to travel. Secured to the forward end of the carrier block 46 is bumper bar 106 extending outwardly where the outer end of it can bump against the rear portion of boom 16. The motion of the endless cable 94 over the various drums is such that with little resistance in the system the drum 84 and the carrier block to which it is attached will be drawn toward drum 88 but if the block 46 is held firmly fixed to frame 32, then the power from drum 88 will be translated through cable 94 to accelerate the speed of drum 84, thereby driving the boom faster and causing it to move relatively ahead of the traveling carrier 14. The purpose of the bumper bar 106 is to cause the carrier block to be slowed down when the bumper bar strikes the frame of the boom thereby speeding up the travel of the boom. As the boom moves forward away from the bumper bar the speed of the carrier block is slightly slowed down so that the relative balance between speed and power is maintained by intermittent correction.

The manner in which the power is delivered to the various units will now be described:

The motor 18 is provided with a transmission 108 having a clutch handle 110. At the rear of the transmission 108 is a pinion 112 which drives pinion 114 on jack-shaft 116 by means of a chain drive. Power is transmitted from pinion 118, also on the shaft 116 to pinion 120 by another chain drive. Through transmission 122, power is transmitted from pinion 120 to a two-speed axle not shown, to front wheels 34.

Jack-shaft 116 also drives transmission 124 provided with pinion 126. Power is transmitted from pinion 126 through chain drive to pinion 128 on shaft 130, a part of gear box 132, driving shaft 134 upon which is mounted power drum 88. A clutch with lever 136 is provided for disengaging the drive of the power drum.

Shaft 130 also carries pinion 138 which drives large pinion 140 attached to slip clutch 142, operated by handle 144, through shaft 146 and transmission 148. Clutch 142 is connected to rewind drum 154 upon which is wound cable 156. This cable passes around sheave 158 to connect to the inlet fitting of the metallic hose 38.

When it is desired to begin the sprinkling operation and, assuming that the machine is in starting position with the inlet fitting at the front of the machine and the boom located at the rear, the transmission 124 is set in low gear and clutch lever 136 is thrown in to transmit power to the power drum 88. The machine then goes forward until the inlet fitting is located at the rear of the machine and the boom is located at the front. At this point the machine is stopped, the lever of transmission 124 is shifted to neutral and the inlet fitting 28 is disconnected from the supply line 10. Clutch lever 136 is disengaged, gears are shifted in transmission 124 to high, and slip clutch lever 144 is engaged. As the machine goes forward cable 156 is rewound on drum 154. The rate at which cable 156 is wound on drum 154 is controlled by manipulating handle 152 of brake 150 so that metallic hose 28 is returned smoothly to its starting position. Meanwhile the boom 16 remains stationary as does carrier block 46. Power drum 88 being disengaged, the cable 94 is free to move as the carrier block remains fixed while the machine moves forward beneath it. At the end of this second phase of the machine's travel, the inlet fitting 22 is in position over the next opening 12 in the supply line ready to be connected and the process of the first phase may be repeated.

The sequence of operations is shown schematically in Figure 2: At (*a*) flexible hose 38 has just been connected to the supply line at 12 and the hose extends back around the rear of carrier 14 to boom 16. At (*b*) the carrier 14 has advanced approximately one-half its length while the boom 16 has advanced approximately twice that far. At (*c*) the boom has advanced another carrier length while the carrier has only advanced another half length. The boom has reached the limit of its forward travel and the flexible tube 38 has reached the end of its travel as connected to fitting 12. At this point it is ready for disconnection. At (d) the hose 38 is disconnected from the first fitting, the boom has remained stationary while the carrier 14 has moved forward half a length. At (a2) the carrier has moved forward another half length permitting hose 38 to be connected at the second fitting 12, while the boom remains at the position reached in (c). At (b2) the sequence of operations has continued with the boom having advanced another complete length from the position in (a2). The continuation of the sequence is shown at (c2).

My invention has the advantage that while it is capable of irrigating a wide stretch of field, it may equally well be used on narrower fields. It is sufficiently flexible in operation as to be adaptable to irregularities of the ground. It can be operated continuously throughout the day by only two men and does not require heavy exertion on the part of the operators. The machine has excellent steering qualities since the steering wheels of the sprinkling unit move in advance thereof over dry ground. The operative units of the device are easily coupled and uncoupled one from the other and when uncoupled the various units may be transported from field to field without difficulty.

It will be seen from the foregoing that I have provided a sprinkling and irrigating device that is economical and versatile in operation. I desire the scope of my invention to be limited only by the following claims.

I claim:

1. A self-propelled sprinkling device for use with a supply pipe having outlets at spaced points including a power and transfer unit and a sprinkling unit, the transfer unit being provided with means for connection with the successive outlets in turn and adapted to travel along the length of the supply pipe, an elongated wheeled frame for the transfer unit, an elongated flexible hose, a flexible connection between one end of the hose and the connection to the supply pipe, a flexible connection between the other end of the hose and the sprinkling unit, a track extending along both sides and an end of the frame about which the hose may move, and materially longer than said hose, means for supporting and guiding said hose in its movement back and forth in said track, means for pulling said hose back and forth in said track, a source of power for advancing the transfer unit along the supply pipe, a source of power for the pulling means, a source of power for moving the sprinkling unit, means for transmitting the power from said last mentioned source to the sprinkling unit, steering means for the transfer unit; at least one section of sprinkling unit adapted to travel, extending substantially at right angles to the transfer unit, along the length thereof, each section having a frame, a sprinkling pipe, means for receiving power at the end nearest the transfer unit, a drive shaft connected thereto and extending the length of the frame section, a steering wheel traveling in advance of the frame section, a driving wheel, means operably connecting the drive shaft and the driving wheel, means for setting the direction of the steering wheel, releasable means for holding the driving wheel for driving the sprinking unit in a forward direction, which means when released permits the unit to be towed lengthwise of itself, and cooperating means for securing two or more sections of sprinkling unit in operative end-to-end relationship.

2. A self-propelled sprinkling device for use with a supply pipe having outlets at spaced points including a power and transfer unit and a sprinkling unit, the transfer unit being provided with means for connection with the successive outlets in turn and adapted to travel along the length of the supply pipe, an elongated wheeled frame for the transfer unit, an elongated flexible hose, a flexible connection between one end of the hose and the connection to the supply pipe, a flexible connection between the other end of the hose and the sprinkling unit, a track extending along both sides and an end of the frame about which the hose may move, and materially longer than said hose, means for supporting and guiding said hose in its movement back and forth in said track, means for pulling said hose back and forth in said track, a source of power for advancing the transfer unit along the supply pipe, a source of power for the pulling means, a source of power for moving the sprinkling unit, means for transmitting the power from said last mentioned source to the sprinkling unit, and a sprinkling unit adapted to travel, extending substantially at right angles to the transfer unit, along the length thereof, having a frame, a sprinkling pipe, means for receiving power at the end nearest the transfer unit, a drive shaft connected thereto and extending the length of the frame, a driving wheel, means operably connecting the drive shaft and the driving wheel.

3. A self-propelled sprinkling device for use with a supply pipe having outlets at spaced points including a a power and transfer unit and a sprinkling unit, the transfer unit being provided with means for connection with the successive outlets in turn and adapted to travel along the length of the supply pipe, an elongated wheeled frame for the transfer unit, an elongated flexible hose, a flexible connection between one end of the hose and the connection to the supply pipe, a flexible connection between the other end of the hose and the sprinkling unit, a track extending along both sides and an end of the frame about which the hose may move, and materially longer than said hose, means for supporting and guiding said hose in its movement back and forth in said track, means for pulling said hose back and forth in said track, a source of power for advancing the transfer unit along the supply pipe, a source of power for the pulling means, a source of power for moving the sprinkling unit, means for transmitting the power from said last mentioned source to the sprinkling unit; at least one section of sprinkling unit adapted to travel, extending substantially at right angles to the transfer unit, along the length thereof, each section having a frame, a sprinkling pipe, means for receiving power at the end nearest the transfer unit, a drive shaft connected thereto and extending the length of the frame section, a driving wheel, means operably connecting the drive shaft and the driving wheel, and cooperating means for securing two or more sections of sprinkling unit in operative end-to-end relationship.

4. A self-propelled sprinkling device for use with a supply pipe having outlets at spaced points including a a power and transfer unit and a sprinkling unit, the transfer unit being provided with means for connection with the successive outlets in turn and adapted to travel along the length of the supply pipe, an elongated wheeled frame for the transfer unit, an elongated flexible hose, a flexible connection between one end of the hose and the connection to the supply pipe, a flexible connection between the other end of the hose and the sprinkling unit, a track extending along both sides and an end of the frame about which the hose may move, and materially longer than said hose, means for supporting and guiding said hose in its movement back and forth in said track, means for pulling said hose back and forth in said track, a source of power for advancing the transfer unit along the supply pipe, a source of power for the pulling means, a source of power for moving the sprinkling unit, means for transmitting the power from said last mentioned source to the sprinkling unit, and a sprinkling unit adapted to travel, extending substantially at right angles to the transfer unit, along the length thereof, having a frame, a sprinkling pipe, means for receiving power at the end nearest the transfer unit, a drive shaft connected thereto and extending the length of the frame, a steering wheel traveling in advance of the frame, a driving wheel, means operably connecting the drive shaft and the driving wheel, means for setting the direction of the steering wheel, releasable means for holding the driving wheel for driving the sprinkling unit in a forward direction, which means when released permits the unit to be towed lengthwise of itself.

5. A self-propelled sprinkling device for use with a supply pipe having outlets at spaced points including a wheeled power and transfer unit and a wheeled sprinkling unit, the transfer unit being provided with means for connection with the successive outlets in turn and adapted to travel along the length of the supply pipe, said unit being further provided with means for moving said connection rearwardly of its length as it advances along the supply pipe, said unit being also provided with a flexible connection between said first connection and the sprinkling unit, the sprinkling unit extending substantially at right angles to the direction of travel, being provided with sprinkling outlets along the length thereof and being adapted to travel over the ground, alongside the transfer unit.

6. A self-propelled sprinkling device for use with a supply pipe having outlets at spaced points including a power and transfer unit and a sprinkling unit, the transfer unit having means for connection with the successive outlets in turn and adapted to travel along the length of the supply pipe, the sprinkling unit extending substantially at right angles to the direction of travel, being provided with sprinkling outlets along the length thereof and being adapted to travel with the transfer unit, said transfer unit having a track extending substantially all around two sides and an end thereof, a flexible hose of less length than the track for movement the length thereof and communicating with the connection to said outlet, said hose being flexibly connected to the sprinkling unit, means for moving said hose progressively in one direction in said track so that, as the transfer unit moves along the supply pipe the connection between the outlet and the hose remains undisturbed while the point of connection between the hose and the sprinkling unit moves forward with the sprinkling unit at twice the speed of travel of the transfer unit, means for moving the hose progressively in reverse direction in the track, when the connecting means between the outlet and the transfer unit is broken, to the former position and means for propelling the transfer and sprinkling units along the supply pipe.

7. In a self-propelled irrigation device having a plurality of units, wherein each unit moves forward in the same direction but independently of the other and wherein power for such movement is derived for one of said units from another of said units, the means for transmitting power from the powered unit to the driven unit that includes a source of power on the powered unit, a powered cable drum driven thereby, a track extending lengthwise of the power unit in its direction of travel, a carrier block adapted for movement along said track, a driven cable drum mounted on said carrier block, an endless cable passing around said drum and around a fixed portion of the powered unit remote from said drum, a driving connection between the driven cable drum and the driven unit and stop means mounted on the carrier block and abutting a portion of the driven unit, so arranged that as the driven unit is slowed down with respect to the powered unit that the carrier block is stopped momentarily causing speeding up of the driven cable drum until the speed of the driven unit catches up to that of the power unit.

References Cited in the file of this patent
UNITED STATES PATENTS
954,241    Affelder _____ Apr. 5, 1910